(12) United States Patent
Bogoslofski et al.

(10) Patent No.: US 9,738,228 B2
(45) Date of Patent: *Aug. 22, 2017

(54) WATERSPORT EQUIPMENT CARRIER

(71) Applicant: Thule Sweden AB, Hillerstorp (SE)

(72) Inventors: Kevin Bogoslofski, Southington, CT (US); James Stevens, Cheshire, CT (US); Greg Weaver, Waterbury, CT (US); John Laverack, Southbury, CT (US)

(73) Assignee: Thule Sweden AB, Hillerstorp (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/807,774

(22) Filed: Jul. 23, 2015

(65) Prior Publication Data
US 2015/0329058 A1    Nov. 19, 2015

Related U.S. Application Data

(63) Continuation of application No. 13/810,789, filed as application No. PCT/US2011/045944 on Jul. 29, 2011, now Pat. No. 9,126,540.
(Continued)

(51) Int. Cl.
*B60R 9/048* (2006.01)
*B60R 9/055* (2006.01)
*B60R 9/08* (2006.01)

(52) U.S. Cl.
CPC .............. *B60R 9/048* (2013.01); *B60R 9/055* (2013.01); *B60R 9/08* (2013.01)

(58) Field of Classification Search
CPC .. B60R 9/048; B60R 9/04; B60R 9/08; B60R 9/12; B60R 9/052
(Continued)

(56) References Cited

U.S. PATENT DOCUMENTS 3,592,028 A    7/1971  La Monica
3,875,771 A *  4/1975  Reisner .................. A45C 13/20
                                              24/167
(Continued)

FOREIGN PATENT DOCUMENTS

EP    0050566    4/1982
EP    0281489    9/1988
(Continued)

OTHER PUBLICATIONS

International Searching Authority, International Search Report for International Application No. PCT/US2011/045944, dated Dec. 30, 2011.
(Continued)

*Primary Examiner* — Adam Waggenspack
(74) *Attorney, Agent, or Firm* — Sterne, Kessler, Goldstein & Fox P.L.L.C.

(57) ABSTRACT

A watersport equipment carrier configured to be mounted on a vehicle includes an elongate base having an upper surface configured to receive watersport equipment and a locking portion. A securement strap having an anchor end and a free end and the anchor end is coupled to the base at an anchoring point. A locking mechanism is coupled to the locking portion of the base and configured to secure the free end of the strap to the base such that the free end of the strap passes through the locking mechanism in a locked configuration.

18 Claims, 12 Drawing Sheets

Related U.S. Application Data

(60) Provisional application No. 61/369,475, filed on Jul. 30, 2010.

(58) Field of Classification Search
USPC .................................. 224/455, 460, 534, 568
See application file for complete search history.

(56) References Cited

U.S. PATENT DOCUMENTS

| | | | |
|---|---|---|---|
| 4,312,467 A | 1/1982 | Kulwin | |
| 4,728,019 A | 3/1988 | Olliges | |
| D302,000 S | 7/1989 | Arvidsson | |
| 4,930,671 A | 6/1990 | Tittel | |
| 5,119,980 A | 6/1992 | Grim et al. | |
| D332,243 S | 1/1993 | Collins | |
| D348,034 S | 6/1994 | Mann | |
| 5,456,397 A | 10/1995 | Pedrini | |
| 5,607,093 A | 3/1997 | Geier | |
| D415,096 S | 10/1999 | Englander et al. | |
| 6,199,412 B1 | 3/2001 | Kennedy | |
| 7,108,163 B1 * | 9/2006 | Pedrini | B60R 9/12 224/319 |
| D628,949 S | 12/2010 | Farber | |
| D633,030 S | 2/2011 | Robertson | |
| D642,112 S | 7/2011 | Farber | |
| D642,113 S | 7/2011 | Farber | |
| 8,020,737 B2 * | 9/2011 | Sweeney | B60R 9/048 224/319 |
| 2004/0065705 A1 * | 4/2004 | Shamrell | B60R 9/08 224/319 |
| 2007/0251279 A1 | 11/2007 | Hollier | |
| 2010/0043186 A1 * | 2/2010 | Lesley | A44B 11/16 24/68 CD |
| 2015/0191127 A1 | 7/2015 | Sautter et al. | |

FOREIGN PATENT DOCUMENTS

| | | |
|---|---|---|
| JP | 8085393 | 4/1996 |
| WO | WO 2012016170 | 2/2012 |

OTHER PUBLICATIONS

Yakima "SUPDawg" Product Manual, 15 pages.

\* cited by examiner

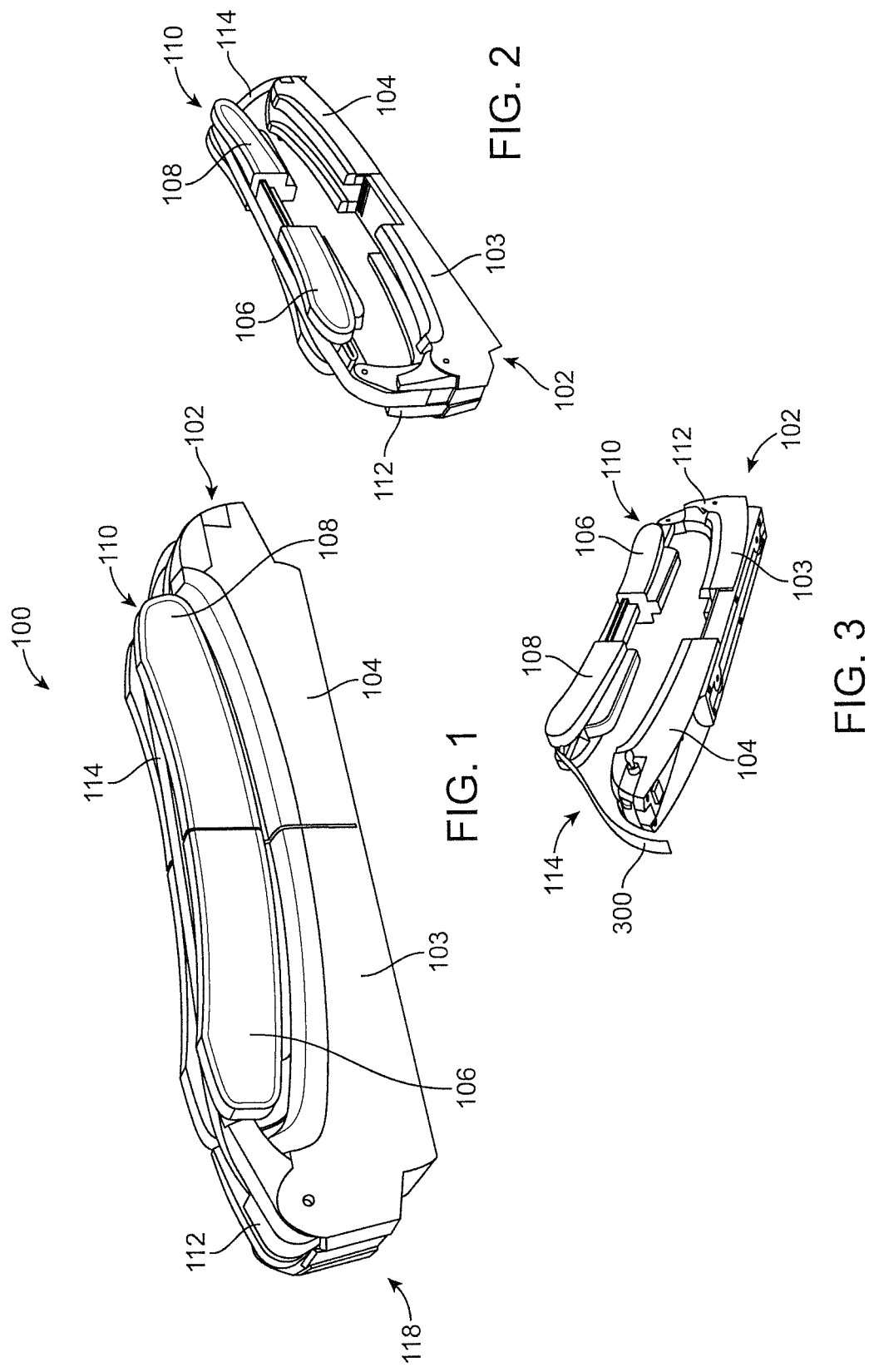

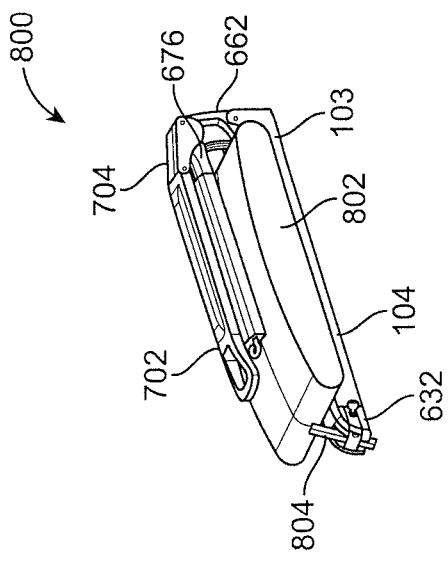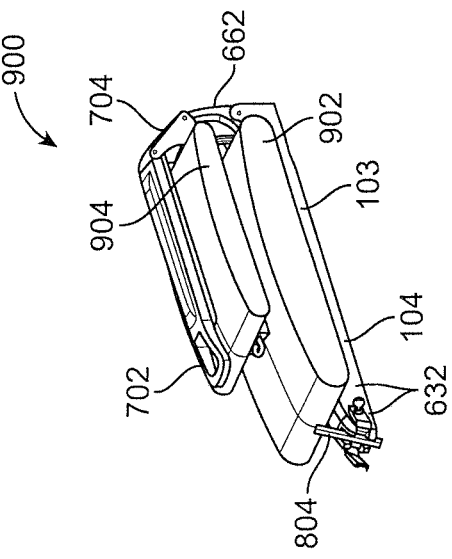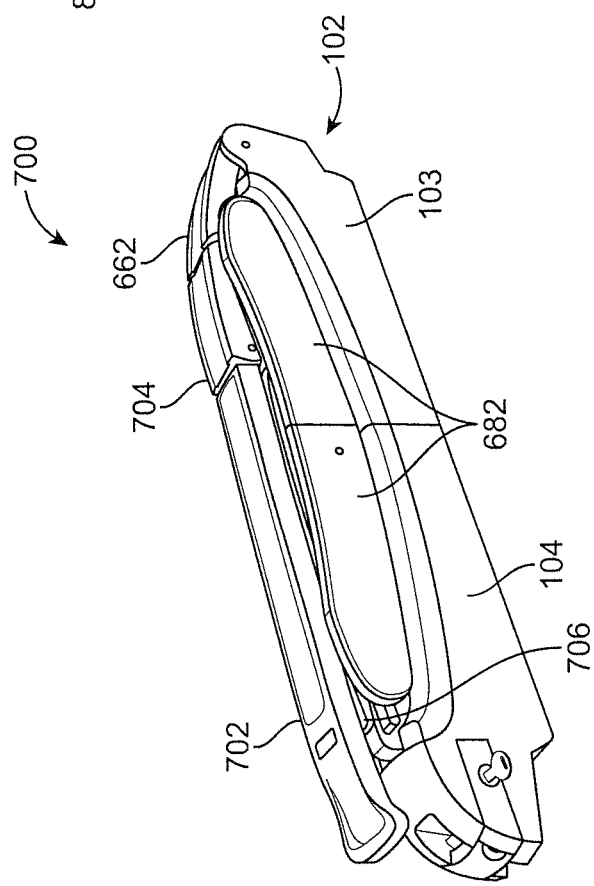
FIG. 7
FIG. 8
FIG. 9

WATERSPORT EQUIPMENT CARRIER

CROSS-REFERENCE TO RELATED APPLICATIONS

This application is a continuation of U.S. application Ser. No. 13/810,789, filed Jan. 17, 2013, which claims the benefit of U.S. Provisional Application No. 61/369,475, filed Jul. 30, 2010 and priority to U.S. Design application No. 29/397, 281, filed Jul. 14, 2011, the disclosures of which are hereby expressly incorporated herein by reference, in their entireties. Application Ser. No. 13/810,789 is a National Stage Application of International Application No. PCT/US2011/045944, filed Jul. 29, 2011, which is also incorporated by reference herein in its entirety.

FIELD OF THE TECHNOLOGY

The present disclosure relates generally to a locking surfboard carrier. More specifically, the present disclosure relates to a locking surfboard carrier for transporting one or more water sport board devices such as surfboards, parasail boards and the like.

BACKGROUND OF THE TECHNOLOGY

Safely transporting sports gear is a concern for many sport enthusiasts. For example, transporting a surfboard in a trunk raises many safety concerns. In the event that the surfboard falls out of the trunk, not only can the surfboard be damaged, but the surfboard can cause bodily harm or property damage as vehicles attempt to avoid the fallen surfboard. In addition, security of the surfboard can be an issue in that the surfboard may be stolen from an open trunk of a vehicle.

BRIEF DESCRIPTION OF THE DRAWINGS

Implementations of the present application will now be described, by way of example only, with reference to the attached figures, wherein:

FIG. 1 is a perspective view of a surfboard carrier in accordance with an example embodiment;

FIG. 2 is a left side perspective view showing a bottom hinge of a surfboard carrier in accordance with an example embodiment;

FIG. 3 is a right side perspective view showing a bottom hinge of a surfboard carrier in accordance with an example embodiment;

FIG. 7 is a perspective view of a surfboard carrier in accordance with an example embodiment;

FIG. 8 is a perspective view of a surfboard carrier securing a single surfboard in accordance with an example embodiment;

FIG. 9 is a perspective view of a surfboard carrier securing two surfing devices in accordance with an example embodiment;

DETAILED DESCRIPTION

Figure 5:
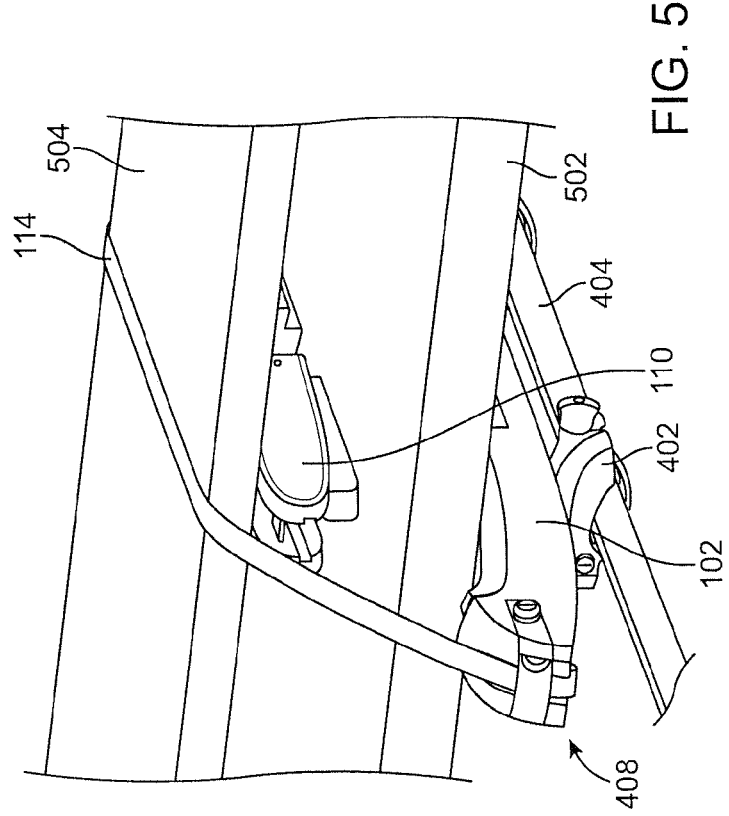
FIG. 5 is a perspective view of a surfboard carrier securing two surfing devices in accordance with an example embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant function being described. Also, the description is not to be considered as limiting the scope of the implementations described herein.

Generally speaking, the surf carriers of the various example embodiments described herein have a base with one or more pads on which a first water sport board device (generically referred to herein as "surfboard") can rest on top of the one or more pads, a middle arm having one or more pads on a top surface and one or more pads on the bottom surface in which a second surfing device can rest on top of the one or more pads on the top surface of the middle arm, and a strap coupled to the base; e.g., via a hinge, with the strap securing the first surfing device and the second surfing device to the base. The strap can be locked to the base, thereby securing one or more surfing devices and preventing unauthorized access to the one or more surfing devices.

Referring to FIG. 1, a perspective view of a surfboard carrier in accordance with an example implementation is illustrated. As shown, the surfboard carrier 100 can include a left base 103 and a right base 104. The right base 103 or main base 103 and the left base 104 or sliding base 104 collectively constitute elongate base 102 and can be slidingly coupled to one another with one or both bases 103, 104 being capable of sliding. In one or more embodiments, the main base 103 and sliding base 104 can be a single piece or can be multiple pieces. The surfboard carrier 100 can include an inner middle pad 106 and an outer middle pad 108. In one or more embodiments, the inner middle pad 106 and the outer middle pad 108 can be a single piece or can be multiple pieces. The inner middle pad 106 and outer middle pad 108 can be coupled to, and together constitute a middle arm 110 or securement arm 110. Both of the inner middle pad 106 and outer middle pad 108 can be slidingly coupled to the middle arm 110.

The surfboard carrier 100 can include a hinge 112 pivotally coupled at a first end 122 to the base 102 at a hinge-end 118 of the carrier 100. One end of a strap 114 can be coupled to the hinge 114 at an anchor end 120 of the strap 114. The strap 114 can be used to secure a surfing device (not shown) such as a surfboard or a wind surfing board or the like to the surfboard carrier 100. As shown in FIG. 1, the surfboard carrier 100 can be in a transport position or locked position with the free end of the strap 114 secured to the right base 104. The base 102 can be configured with one or more upper support surfaces 116 enabled to receive a surfboard.

Referring to FIGS. 2 and 3, left and right perspective views of the surfboard carrier with the hinge 112 in an extended position in accordance with an example embodiment, respectively, are illustrated. As shown, the hinge 112 can be extended upwards from the elongate base 102 allowing space for a surfing device (not shown) to reside between the middle pads 106, 108 and the base 102; e.g., the main base 103 and the sliding base 104. The upper support surfaces 116 of the base can include one or more pads having an engagement surface 200 configured to receive a surfboard. The hinge-end 118 of the carrier 100 can be coupled to a strap 114, the strap having a distal end 300 which can be passed through a locking mechanism on the base 102 in order to secure at least one surfboard to a vehicle. As shown in these figures, the sliding base 104 can be configured to adjustably slide away from the main base 103 to accommodate a surfing device (not shown). Similarly, the outer middle pad 108 and inner middle pad 106 can also be separated to accommodate a surfing device (not shown). The sliding capability of the sliding base 104 and of the outer middle pad 108 can allow the surfboard carrier 100 to accommodate surfing devices having different widths. Similarly, the sliding capability of the securement arm support pads 106, 108 can allow the surfboard carrier 100 to accommodate surfing devices having different widths and thicknesses. As a result, the surfboard carrier 100 can secure two surfing devices having the same or different widths and thicknesses. Hence, the surfboard carrier 100 can be a universal surf device carrier.

Figure 4:
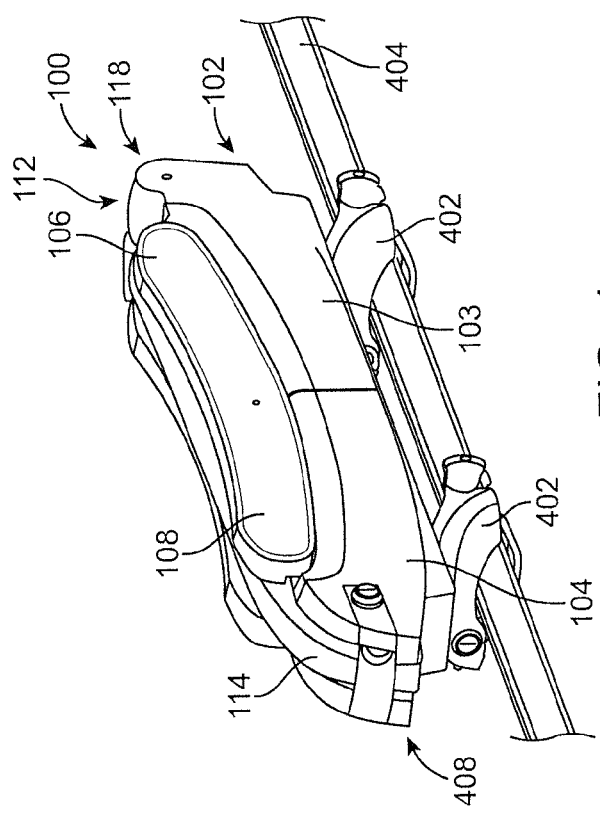
FIG. 4 is a perspective view of a surfboard carrier coupled to a cross bar in accordance with an example embodiment.

Referring to FIG. 4, a perspective view of a surfboard carrier coupled to a cross bar attached to a vehicle (not shown) in accordance with an example embodiment is illustrated. As shown, the surfboard carrier 100 can be coupled to one or more mounting feet 402 with each mounting foot 402 being coupled to a cross bar 404. In use, a first surfboard carrier 100 can be coupled to a first cross bar 404 and a second surfboard carrier 100 can be coupled to a second cross bar 404. When securing a surfboard, the strap can be releasably locked by a locking mechanism near a distal end 408 away from the hinge-end 118 of the carrier 100. Each of the mounting feet 402 can include a locking device (not shown) to lock the mounting foot 402 to a cross bar 404. In one or more embodiments, the surfboard carrier 100 can be coupled directly to a cross bar 404.

Referring to FIG. 5, a perspective view of a surfboard carrier securing two surfing devices in accordance with an example embodiment is illustrated. FIG. 5 represents an example of a transport or locked position or configuration of a carrier. As shown, a first surfing device 502 (surfboard shown as a partial view) can be secured on top of the elongate base 102 and a second surfing device 504 (shown as a partial view) can be secured on top of the securement arm 110. The first surfing device 502 can rest against an engagement surface 200 at the underside of the arm 110. The strap 114 can extend over the second surfing device 502 and can be coupled to the surfboard carrier 100 at a distal end 408 of the carrier 100.

Figure 6:
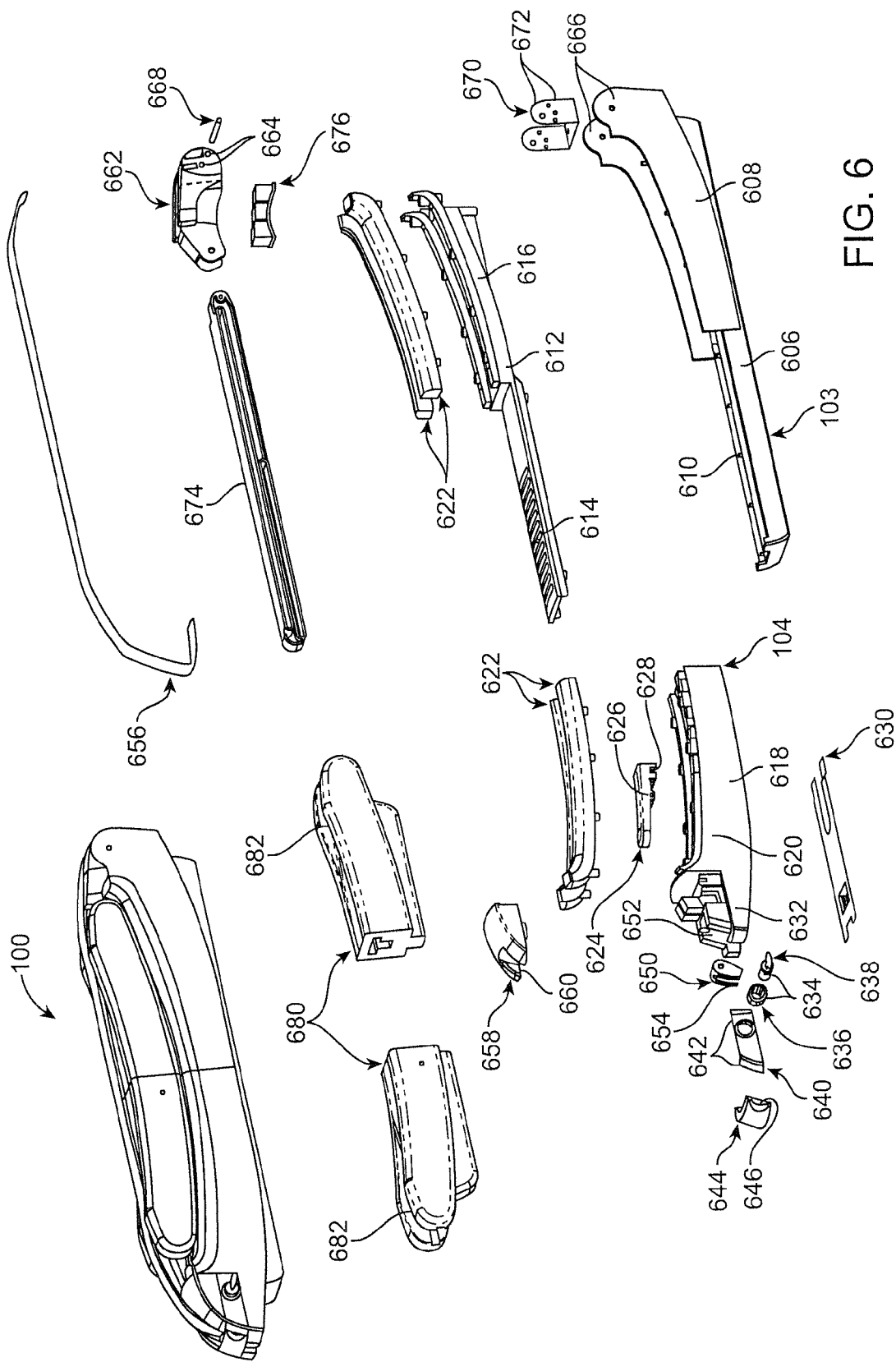
FIG. 6 is an exploded view of a surfboard carrier in accordance with an example embodiment.

Referring to FIG. 6, an exploded view of the surfboard carrier in accordance with an example embodiment is illustrated. As shown, the surfboard carrier 100 can comprise an elongate base 102. A sliding base 104 can be slidingly coupled with a main base 103. In one or more embodiments, one or both of the main base 103 and sliding base 104 can slide. In yet other embodiments, neither base 103, 104 can slide. As shown, the main base 103 can comprise a tray 606 and extended walls 608. The tray 606 and extended walls 608 can be one piece or multiple pieces. Walls of the tray 606 can form a cavity 610. A base insert 612 can be inserted into the cavity 610 of the main base 103. One or more fasteners, including but not limited to, screws or glue, can couple or fasten the insert to the main base 103. The base insert 612 can include one or more detents 614 and a curved portion 616. The main base 103, sliding base 104, tray 606, extended walls 608, and base insert 612 can be made of, but not limited to, a hard plastic.

The sliding base 104 can include extended side walls 618. The sliding base 104 can include a curved portion 620. The curved portions 616, 620 can conform to the shape of a surfing device. The curved portions 616, 620 can be configured to receive one or more base pads 622. As shown, there are four base pads; e.g., two base pads 622 for the main base 103 and two base pads 122 for the sliding base 104. Each base pad 622 can be made of, but not limited to, rubber or foam or other suitable material. Each base pad 622 can comprise an engagement surface 200 for engaging a surfboard. The base pads 622 and the curved portions 616, 620 can include male and female connectors to secure the base pads 622 to the corresponding curved portion 616, 620. Each base pad 622 can be coupled or fastened to a corresponding curved portion 616, 620 using one or more fasteners, such as but not limited to, screws or glue. In one or more embodiments, the base pad 618 and curved portion 616 can be one piece. The extended walls 608, 618 and base pads 622 can be approximately the same height such that a surfing device can be supported evenly or substantially evenly on the base pads 622.

A base button 624 can be pivotally coupled to the sliding base 104. For example, the base button 624 can include a button channel 626 for receiving a button pin (not shown) which can be coupled to the extended walls 618 of the sliding base 104. The base button 624 can include one or more extending flanges 628 configured to be received in one or more corresponding detents 614 of the main base 103. When one or more of the extending flanges 628 of the base button 624 are received in one or more corresponding detents 614 of the main base 103, the sliding base 104 is locked in place and can no longer slide. When the base button 624 is pressed, the extending flanges 628 of the base button 624 can disconnect or unlock from one or more of the corresponding detents 614 of the main base 103 allowing the sliding base 104 to slide toward or away from the main base 103. In one or more embodiments, the extending flanges 628 can comprise one or more detents configured to engage one or more indents in the main base 103 and thereby operate to releasably connect the sliding base 104 to the main base 103. In one or more embodiments, the sliding base 104 can have a top surface (not shown) with the base button 624 being flush with the top surface. In one or more embodiments, the detents 614 and base button 621 can be located on the other side; e.g., on the sliding base 104 and the main base 103, respectively. In one or more embodiments, other controllers for controlling the sliding of the main base 103 and sliding base 104 can be used.

The sliding base 104 can include a locking portion 632. The locking portion 632 can comprise a lock 634 and strap restraining components. The lock 634 can include a lock cylinder housing 636 and a key 638 for locking the surfboard carrier 100. The lock cylinder housing 636 can be received, fully or partially, in a strap catch 640. If the lock cylinder housing 636 is only partially received in the strap catch 640, the rest of the lock cylinder housing 636 can be received within the sliding base 104 and/or in the locking portion 632 of the sliding base 104. The strap catch 640 can be pivotally coupled to a side of the sliding base 104. For example, the strap catch 640 can include a pin channel 642 at about one distal end to receive a lock pin (not shown) to pivotally couple the strap catch 640 to the sliding base 104. In the locked position, the strap catch 640 can be flush with the side of the sliding base 104. In the unlocked position, the strap catch 640 can pivot away from the side of the sliding base 104. The other end of the strap catch 640; e.g., the end opposite the end with the pin channel 642, can include a strap door flange 642. The strap door flange 642 can assist in securing a strap door 644 when the strap catch 640 is in the locked position. The strap door 644 can include an extended end 646 at about one distal end. The extended end 646 and strap door flange 642 can interact securing the strap door 644 to the locking portion 632 of the sliding base 104. At the opposite end of the strap door 644; e.g., the end opposite the extended end 646, a strap door channel 648 can be included for pivotally connecting the strap door 644 to the locking portion 632 of the sliding base 104 via a pin (not shown). The strap door 644 can be pivotally coupled to the side or end of the locking portion 632 of the sliding base 104. In the locked position, the strap door 644 can be flush with the locking portion 632 of the sliding base 104. In the unlocked position, the strap door 644 can pivot away from the end of the locking portion 632 of the sliding base 104.

The locking portion 632 can include a strap cam 650. The strap cam 650 can be coupled to the locking portion 632; e.g., in an indent 652 formed in the locking portion 632. One or more cam flanges 654 or teeth can be on a surface of the strap cam 650. The one or more cam flanges 654 can assist in securing a strap 114. For example, the strap 114 can be placed in the indent 652 of the locking portion 632 and when the strap door 644 is in the locked position, friction can assist in securing the strap 114 against the cam flanges 654, "locking" or securing the strap 114 in place. The sliding base 104 can include a plate 630 coupled to the bottom of the sliding base 104. One or more fasteners, including but not limited to, screws and glue, can couple or fasten the plate 630 to the bottom of the sliding base 104. The plate 630 can include a retaining component (not shown) to assist in retaining the strap 114. In one or more embodiments, other locking systems can be used to lock the strap 114 in place and prevent unauthorized access to the strap 114.

The locking portion 632 can include a cap 658 to cover the locking portion 632. The cap 658 can assist in preventing foreign matter, such as dirt, from entering the locking portion 632. The cap 658 can form a strap receiving portion 660 to allow the strap 114 to rest on (and/or guide the strap 114) the strap receiving portion 660. The cap 658 can include mating components configured to interact with mating components on the locking portion 632 to secure the cap 658 to the locking portion 632. In one or more embodiments, other fasteners, including but not limited to, screws or glue, can be used to secure the cap 658 to the locking portion 632.

The locking portion 632 and cap 658 can be made of, but not limited to, a hard plastic. The locking cylinder housing 636, key 638, strap catch 640, strap door flange 642, strap door 644, extended end 646, and strap cam 650 can be made of, but not limited to, steel or hard metal.

The surfboard carrier 100 can include a bottom hinge 662 pivotally coupled to the main base 103. For example, the bottom hinge 662 (e.g. 112) can include apertures 664 and the extended walls 618 of the main base 103 can include apertures 666 to receive a connector 668 to couple the bottom hinge 662 to the main base 103. The apertures 664 of the bottom hinge 662 can be located proximate opposite, distal ends of the bottom hinge 662. The bottom hinge 662 can be made of, but is not limited to, a hard plastic. The connector 668 can be, but is not limited to a rod, a spring, pins, or a combination thereof. A reinforcing member 670, such as a u-shaped metal stamping, can be used to assist in securing the bottom hinge 662 to the main base 103. The reinforcing member 670 can include apertures 672 to receive the connector 668. At the other distal end of the bottom hinge 662; e.g., the end opposite the distal end 122 with the apertures 664, a middle arm 674 can be fixedly coupled. For example, a pin (not shown) can fasten the middle arm 674 (e.g. 110) or securement arm 674 (e.g. 110) to the bottom hinge 662. The bottom hinge 662 can pivot in several positions including a transport position and an extended position.

The middle arm 674 can be made of, but not limited to, a hard plastic. In the transport position, the bottom hinge 662 can be in a lowered position e.g., with the middle arm 674 in a horizontal or near horizontal position with respect to the main base 103 and sliding base 104. In the extended position, the bottom hinge 662 can be in a raised position; e.g., with the middle arm 674 in a vertical or near vertical position with respect to the main base 103 and sliding base 104. Using one or more detents (not shown) and one or more springs (not shown), the bottom hinge 662 can remain in a particular configuration; e.g., locked in place. By applying pressure to the middle arm 674, the bottom hinge 662 can pivot; e.g., unlocked. In one or more embodiments, the bottom hinge 662 and the middle arm 674 can be one or more multiple pieces. One end of strap 114 can be fixedly coupled to the bottom hinge 662 or to the main base 103. The other end of the strap 114 can be inserted into or through the locking portion 632. In one or more embodiments, the other end of the strap 114; e.g., the end not coupled to the bottom hinge 662, can include a restraining device (not shown) which prevents the strap 114 from detaching from the locking portion 632. For example, the restraining device of the strap 114 can interact with the restraining component of the plate 630 to prevent the strap 114 from disconnecting from the surfboard carrier 100. The strap 114 can be made of, but is not limited to, nylon, and can include a steel cable covered by the material; e.g., nylon. The bottom hinge 662 can include an upper hinge pad 676. The bottom surface of the upper hinge pad 676 can conform to the shape of a surfing device. The bottom surface of the upper hinge pad 676 can be made of, but not limited to, rubber or foam. The rest of the upper hinge pad 676 can be made of, but not limited to, a hard plastic.

One or more pads can be coupled to the middle arm 674. As shown, middle pads 678, 680 are slidingly coupled to the middle arm 676. In one or more embodiments, one or both of the middle pads 678, 680 can slide. In yet other embodiments, neither middle pad 678, 680 can slide. The middle pads 678, 680 can slide toward or away from each other to accommodate a surfing device (not shown). The sliding capability of the middle pads 678, 680 can allow the surfboard carrier 100 to accommodate surfing devices having different widths. The top portions of the fixed middle pad 678 and of the sliding middle pad 680 can conform to the shape of a surfing device. The top portions of the middle pads 678, 680 can form one or more channels 682 to receive the strap 114. The bottom portions of the middle pads 678, 680 can have various shapes, including but not limited to, substantially flat, or have one or more protrusions to assist in securing the surfing device in place. As shown, each middle pad 678, 680 is one piece, however in one or more embodiments, each middle pad 678, 680 can be multiple pieces and can be coupled to the middle arm 674 using various coupling means. Each middle pad 678, 680 can be made of, but not limited to, rubber or foam.

Figure 6A:
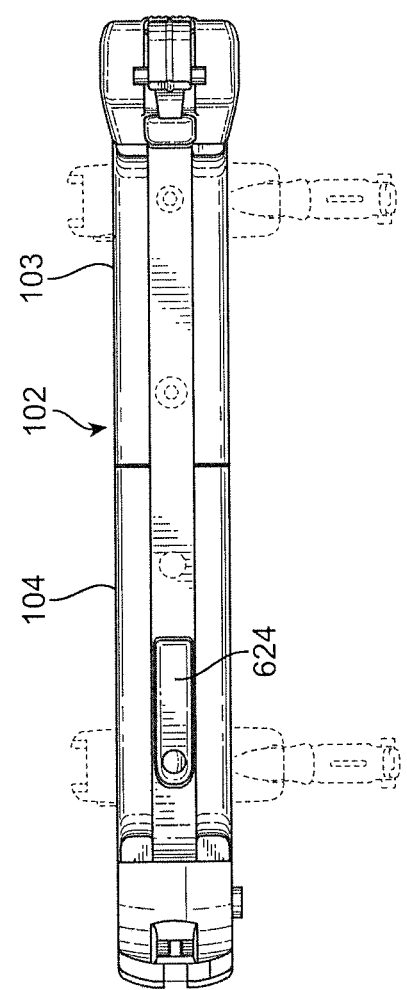
FIG. 6A is a top plan view of a surfboard carrier in accordance with an example embodiment.

Referring to FIG. 6A, a top plan view of a surfboard carrier 100 in accordance with an example embodiment is illustrated. A base button is shown within a button channel 626 in the sliding base 104. Base pad engagement surfaces 200 are coupled to the sliding base 104 and the elongate base 104. An end 300 of the strap is shown in a channel on the securement arm 110. The bottoms of the pads on the securement arm 110 have engagement surfaces 692 which can engage the surface of a surfboard when the surfboard carrier 100 is in a closed configuration.

Figure 6B:
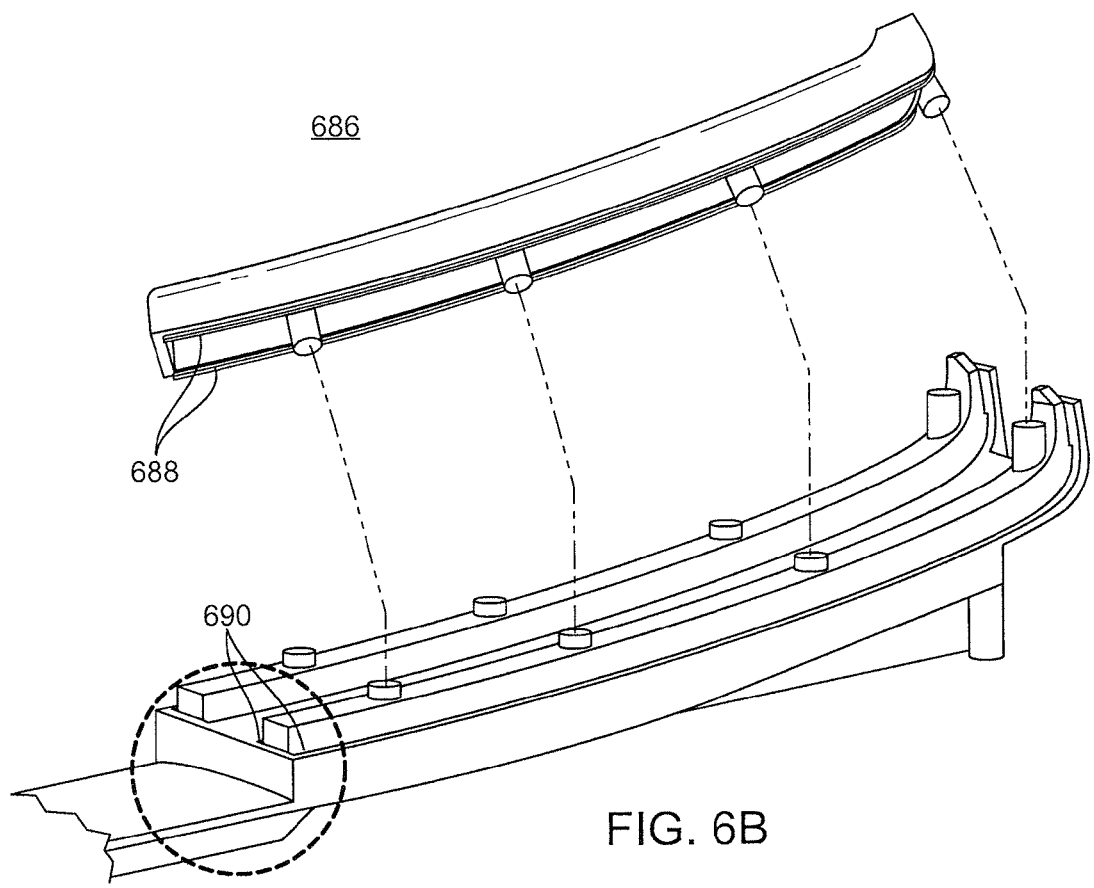
FIG. 6B is a cut away view of a surfboard carrier in accordance with an example embodiment.
Figure 6C:
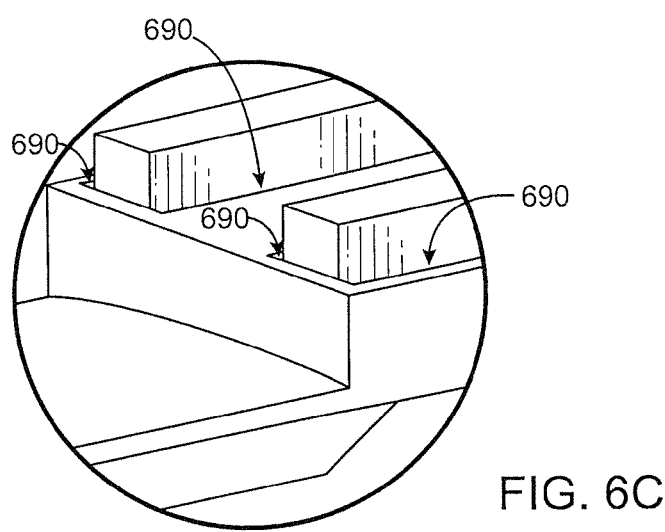
FIG. 6C is a detailed view of a surfboard carrier in accordance with an example embodiment.
Figure 6D:
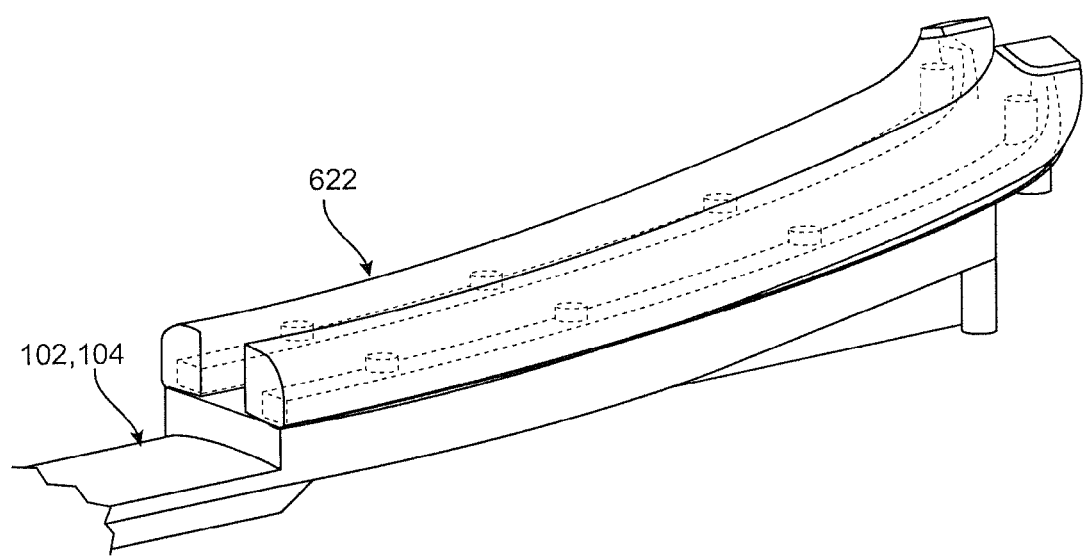
FIG. 6D is a cut away view of a surfboard carrier in accordance with an example embodiment.

Referring to FIG. 6B, a cutaway view of a surfboard carrier 100 in accordance with an example embodiment is illustrated. An example of an interconnection 686 between a support pad and a base is depicted. A pad can be configured with male connectors corresponding with female connectors in a base. A pad can comprise a tongue 688 running along a substantial length of the pad configured to be received by a corresponding groove 690 in the base. FIG. 6C illustrates a detailed view of the base illustrated in FIG. 6B, showing the location of grooves 690 within the base configured to receive a tongue 688 of a pad. FIG. 6D illustrates a see-through view of the surfboard carrier 100 illustrated in FIG. 6A, depicting the relationship between support pads 622 and receiving portions of the base 102, 104.

Referring to FIG. 7, a perspective view of an alternate surfboard carrier in accordance with an example embodiment is illustrated. The alternate surfboard carrier 700 of FIG. 7 is similar to the surfboard carrier 100 of FIG. 1 and FIG. 6 and includes a different means to secure a second surfing device to the surfboard carrier 700. As shown, the surfboard carrier 700 can include a top arm 702. A top hinge 704 can be coupled to the top arm 702 at one end and can be coupled to the bottom hinge 662 at the other end. The top arm 702 and top hinge 704 can be made of, but not limited to, a hard plastic. The top arm 702 can include a top arm pad 706 on the bottom surface of the top arm 702. The top arm pad 706 can be made of, but not limited to, rubber or foam. As shown, the surfboard carrier 700 is in a transport position. In the transport position, the bottom hinge 662 can be in a lowered position; e.g., with the middle arm 674 in a horizontal or near horizontal position with respect to the main base 103 and sliding base 104 and the top hinge 704 can be in a lowered position; e.g., with the top arm 702 in a horizontal or near horizontal position with respect to the middle arm 674. In an extended position, the top hinge 704 can be in a raised position; e.g., with the top arm 702 in a vertical or near vertical position with respect to the main base 103 and sliding base 104. Using one or more detents (not shown) and one or more springs (not shown), the top hinge 704 can remain in place; e.g., be locked in place. By applying pressure to the middle arm 674, the top hinge 662 can pivot; e.g., be unlocked.

In one or more embodiments, the top hinge 704 and the top arm 702 can be one or more multiple pieces. A strap (not shown) can be fixedly coupled to the top hinge 704 or to the top arm 702. For example, one end of the strap can be fixedly coupled to the top arm 702 and can be covered by the top arm pad 706. The strap can be made from a material, such as, but not limited to, nylon, and can include a steel cable covered by the material. The top hinge 704 can include a top hinge pad (not shown). The bottom surface of the top hinge pad can conform to the shape of a surfing device. The bottom surface of the top hinge pad can be made of, but not limited to, rubber or foam. The rest of the top hinge pad, e.g., not the bottom surface, can be made of, but not limited to a hard plastic.

Referring to FIG. 8, a perspective view of the alternate surfboard carrier securing a single surfing device in accordance with an example embodiment is illustrated. As shown, a surfing device; e.g., 802, (shown as a partial view) is secured on top of the main base 103 and the sliding base 104. As shown, the top hinge 704 is in the transport position and the bottom hinge 662 is in the extended position. In this figure, the middle arm 676 includes a different middle pad compared to the middle pads 678, 680 shown in FIG. 6. A partial strap 804 is shown as being locked in the locking portion 632. The top arm 702 can extend over the middle arm 674 and a strap 804 can be coupled to the surfboard carrier 800.

Referring to FIG. 9, a perspective view of the alternate surfboard carrier securing two surfing devices in accordance with an example embodiment is illustrated. As shown, a first surfing device 902 (shown as a partial view) can be secured on top of the main base 103 and the sliding base 104 and a second surfing device 904 (shown as a partial view) can be secured on top of a middle pad. As shown, the top hinge 704 is in the extended position and the bottom hinge 662 is in the extended position. In this figure, the middle arm 676 includes a different middle pad compared to the middle pads 678, 680 shown in FIG. 6. A partial strap 804 is shown as being locked in the locking portion 632. The top arm 702 can extend over the second surfing device 502 and the strap 804 can be coupled to the surfboard carrier 900.

Figure 10:
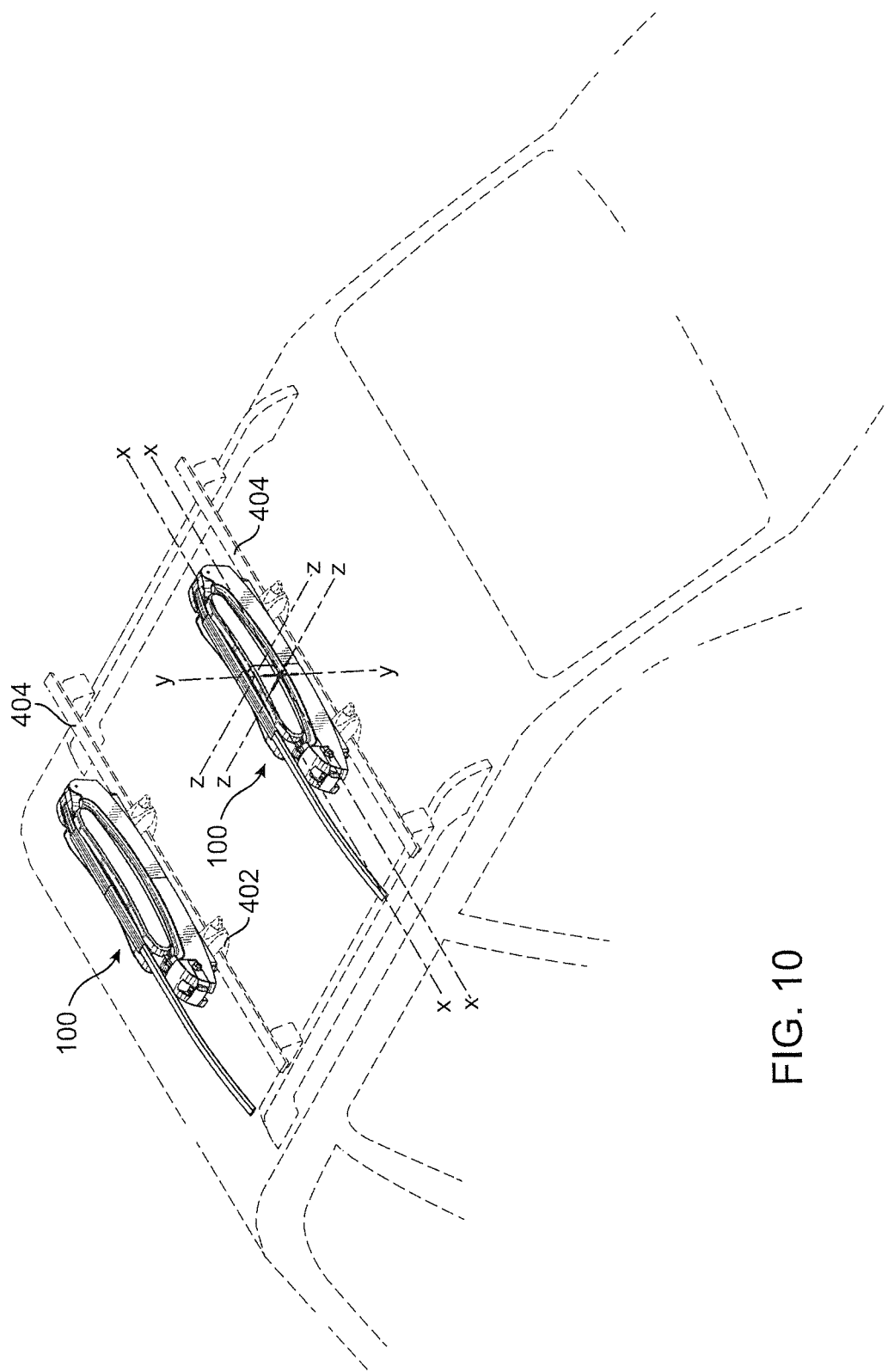
FIG. 10 is a perspective view of two surfboard carriers attached to a vehicle in accordance with an example embodiment.

Referring to FIG. 10, a perspective view of two surfboard carriers installed on a vehicle in accordance with an example embodiment is illustrated. The example carriers 100 are each in an installed orientation 1000. The straps are coupled at a hinge-end 118 of the carrier. The carriers are in unlocked positions because the ends 300 of the straps have not been passed through a locking mechanism on the carrier 100.

Figure 11:
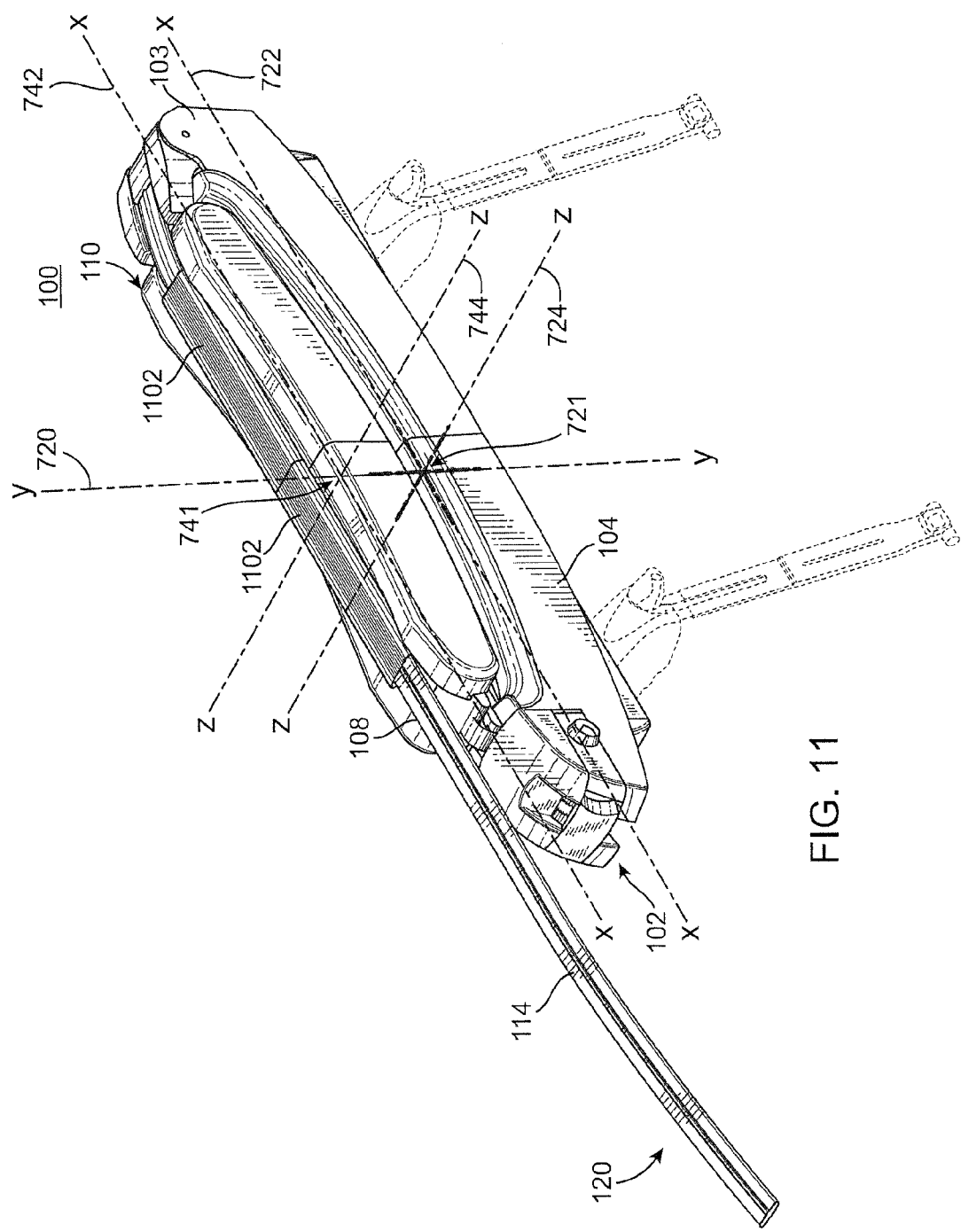
FIG. 11 is a perspective view of a surfboard carrier in accordance with an example embodiment.

Referring to FIG. 11, a perspective view of a surfboard carrier in accordance with an example embodiment is illustrated. An anchor end 120 of a strap 114 is coupled to a hinge-end 118 of carrier 100. A portion of the strap is contained within sheaths 1102. The sheaths 1102 can be adjustably slid along the strap 114 in order to accommodate different sized surfboards just as upper support pads can be slid along the securement arm 110 and the sliding base 104 can be slid along the main base 103. Sheaths 1102 can be made of soft plastic or rubber or other suitable material. Sheaths 1102 can enable the strap 114 to better retain a surfboard placed on the securement arm 110 when the carrier 100 is in a locked configuration 500.

Figure 12:
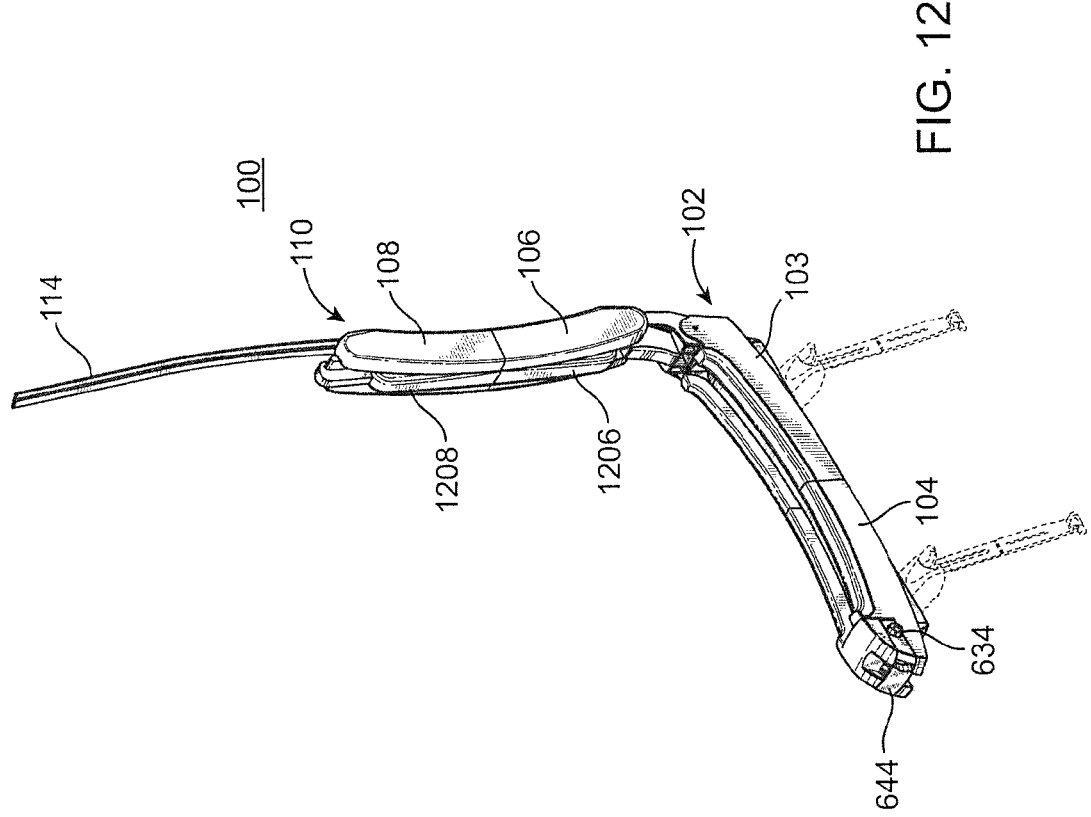
FIG. 12 is a perspective view of a surfboard carrier in an open configuration in accordance with an example embodiment.
Figure 13:
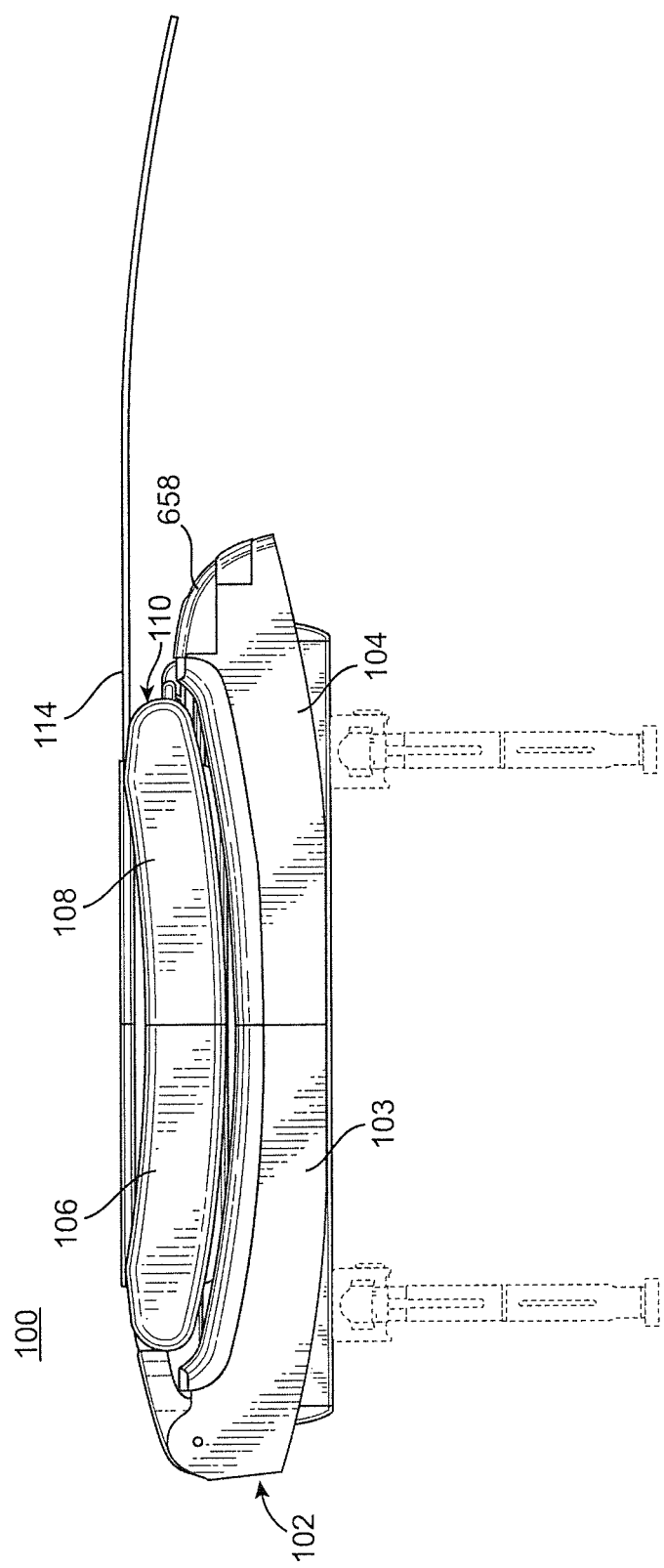
FIG. 13 is a side view of a surfboard carrier in an open configuration in accordance with an example embodiment.
Figure 14:
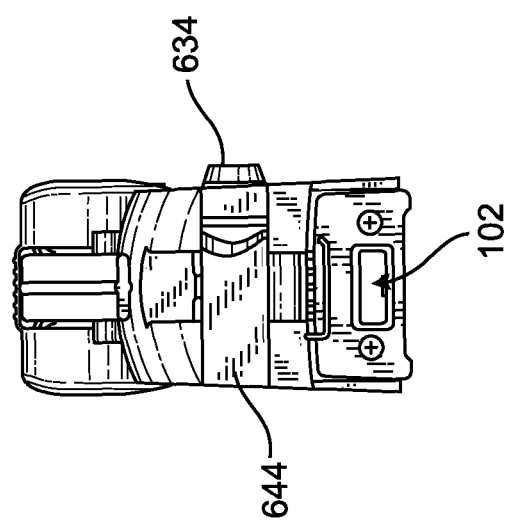
FIG. 14 illustrates a locking portion in accordance with an example embodiment.

Referring to FIG. 12, a perspective view of a surfboard carrier in an open configuration in accordance with an example embodiment is illustrated. The upper pads 106, 108 or middle pads 106, 108 or securement pads 106, 108 comprise raised engagement portions 1206, 1208. Raised engagement portions 1206, 1208 are configured to engage the surface of a surfboard and can enable the securement arm 110 to better secure a surfboard beneath the securement arm 110 when the surfboard carrier 100 is in a transportation configuration.

As described above, at least one example embodiment of a surfboard carrier is a variably configurable surfboard carrier 100 adapted to be mounted on a carrying vehicle. The surfboard carrier 100 can comprise an elongate base 102 having a longitudinal axis and configured to receive a surfboard upon an upper support surface 116 of the base 102. The base 102 can be approximately horizontally oriented when in an installed orientation 1000. The surfboard carrier 100 can also comprise a surfboard securement arm 110, 674 which has a longitudinal axis. The securement arm 110, 674 can be coupled to the elongate base 102 and can be placed in multiple positions relative to the base 102 on a displacement hinge 112 that accommodates variable location and orientation of the securement arm 110, 674 relative to the base 102. The displacement hinge 112 can have an elongate extension body 662 having a first end 122 which is pivotally coupled to the base 102, and an opposite distal end 684 pivotally coupled to the securement arm 110, 674 or middle arm.

The surfboard carrier 100 has a first transport configuration for supporting and securing a surfboard of a first thickness between the base 102 and securement arm 110, 674 wherein the longitudinal axis of the securement arm 110, 674 is located at a first distance above the base 102 and is oriented approximately parallel to the longitudinal axis of the base 102 and a second transport configuration for supporting and securing a surfboard of a second thickness, which is greater than the first thickness, between the base 102 and securement arm 110, 674 wherein the longitudinal axis of the securement arm 110, 674 is located at a second distance, greater than the first distance, above the base 102 and is oriented approximately parallel to the longitudinal axis of the base 102.

As may be best appreciated referring to FIGS. 10 and 11 together, the elongate base 102 has a longitudinal axis 722 that is coincident with an x-axis of a three-dimensional Cartesian coordinate system of the base 102 that has its origin located at the centroid 721 of the base 102. As illustrated, the centroid 721 is located mid-length, mid-width and mid-height of the base 102, where each is measured from opposite extreme exterior surfaces of the base 102. The longitudinal axis 722 of the base 102 is approximately horizontally oriented (within fifteen degrees or horizontal) in the installed orientation 1000 depicted in FIGS. 10 and 11, and in which the y-axis of the Cartesian coordinate system of the base 102 is approximately vertically oriented (within fifteen degrees or vertical). Similarly, a surfboard securement arm 110, 674 is shown that has a longitudinal axis 742 that is coincident with an x-axis of a three-dimensional Cartesian coordinate system of the securement arm 110, 674 and that has its origin located at the centroid 741 of the securement arm 110, 674 defined as described above with respect to the base 102. The longitudinal axis 742 of the securement arm 110, 674 is similarly approximately horizontally oriented (within fifteen degrees or horizontal) in the installed orientation 1000 of FIGS. 10 and 11 wherein the y-axis of the Cartesian coordinate system of the securement arm 110, 674 is approximately vertically oriented (within fifteen degrees or vertical). It should be appreciated that the installed orientation is illustrated in FIGS. 10 and 11, and is established as if the carrier 100 were mounted upon an approximately horizontally oriented load (cross) bar of a roof-top rack system (see FIG. 10). It is not, however, required that the carrier 100 be installed upon a vehicle in order to fall within the scope of the appended claims which merely position the carrier 100 in this described orientation for assessing the limitations recited therein.

At least one example embodiment of a surfboard carrier 100 comprises an elongate base 102 having a longitudinal axis and a plurality of support pads 622 mounted on the elongate base 102. Each pad 622 can include an engagement surface 200 configured for abutting engagement with a surfboard. At least one of the plurality of support pads 622 can be slidingly coupled to the elongate base 102 and lengthwise laterally translatable upon the elongate base for accommodating different sized surfboards.

At least one example embodiment of a surfboard carrier 100 comprises a securement strap 114 coupled to an elongate base 102, a securement arm 110, 674 or a hinge 112 at a hinge-end 118 of the carrier 100 by an anchor end 120 of the strap 114. A distal end of the securement strap 114 can be releasably lockable at a distal end 408 of the carrier 100, opposite the hinge-end 118, to the base 102 or the arm 110, 674 or the base 102 and the arm 110, 674, for securing a surfboard atop the securement arm 110, 674 in a locked configuration 500 of the carrier 100.

Example implementations have been described hereinabove regarding various example embodiments of a variably configurable surfboard carrier. The example embodiments are intended to constitute non-limiting examples. The subject matter that is intended to be within this disclosure is set forth in the following claims.

What is claimed is:

1. A watersport equipment carrier configured to be mounted on a vehicle, the watersport equipment carrier comprising:
    an elongate base having an upper surface configured to receive watersport equipment and a locking portion;
    a securement strap having an anchor end and a free end, wherein the anchor end is coupled to the base at an anchoring point, wherein the anchoring point is configured to slide along a longitudinal axis of the base while coupled to the base;
    a locking mechanism coupled to the locking portion of the base and configured to secure the free end of the strap to the base, wherein the free end of the strap passes through the locking mechanism in a locked configuration; and
    a release mechanism configured to release the strap from the locked configuration,
    wherein the release mechanism comprises a strap door disposed at a distal end of the locking portion, and
    wherein the strap door is pivotally coupled to the locking portion such that the strap door can pivot away from engagement with the strap to release the strap.

2. The watersport equipment carrier of claim 1, wherein the locking portion is disposed at an end of the base and the locking mechanism comprises a strap cam configured to frictionally engage the strap against an interior surface of the locking mechanism to secure the strap in the locking mechanism.

3. The watersport equipment carrier of claim 1, wherein the anchoring point is fixed relative to the base.

4. The watersport equipment carrier of claim 2, wherein the locking mechanism is disposed in a housing and the interior surface is part of the housing.

5. The watersport equipment carrier of claim 4, wherein the interior surface is part of the housing.

6. The watersport equipment carrier of claim 1, further comprising a lock, wherein the lock prevents actuation of the release mechanism when in a locked position.

7. The watersport equipment carrier of claim 6, wherein the lock comprises a lock cylinder extending through a housing of the lock portion of the base.

8. The watersport equipment carrier of claim 2, wherein the strap cam comprises teeth to engage the strap.

9. The watersport equipment carrier of claim 2, wherein the strap can be tightened by pulling the free end of the strap through the locking mechanism.

10. The watersport equipment carrier of claim 1, wherein by passing through the locking mechanism, the free end of the strap moves from a top side of the base to a bottom side of the base.

11. The watersport equipment carrier of claim 1, further comprising a first mounting foot disposed at the end of the base having the locking portion and a second mounting foot disposed at a second end of the base, wherein the first and second mounting foot are configured to couple the base to a cross bar on the vehicle.

12. The watersport equipment carrier of claim 1, wherein the strap comprises a steel cable covered by nylon.

13. The watersport equipment carrier of claim 1, wherein the watersport equipment is a surfboard.

14. A system for securing watersport equipment on a roof of a vehicle, the system comprising:
an elongate base having a longitudinal axis and an upper surface configured to receive the watersport equipment;
a pair of mounting feet, one disposed at each end of the base, configured to couple the base to a cross bar on the vehicle;
a securement strap having an anchor end and a free end, wherein the anchor end is coupled to the base at an anchoring point, wherein the anchoring point is disposed along the longitudinal axis of the base, and wherein the anchoring point is configured to slide along the longitudinal axis of the base while coupled to the base; and
a locking portion at an end of the base, comprising:
a locking mechanism disposed in a housing, wherein the free end of the strap passes through the locking mechanism in a locked configuration, and wherein the locking mechanism is configured to frictionally secure the strap within the locking mechanism in the locked configuration,
a release mechanism configured to release the strap from the locked configuration, wherein the release mechanism comprises a strap door disposed at a distal end of the locking portion, and wherein the strap door is pivotally coupled to the locking portion such that the strap door can pivot away from engagement with the strap to release the strap, and
a lock having a lock cylinder extending through the housing, wherein the lock prevents actuation of the release mechanism when in a locked position.

15. The system of claim 14, further comprising a key configured to move the lock from the locked position to an unlocked position, wherein the release mechanism can be actuated when the lock is in the unlocked position.

16. A method for securing watersport equipment to a carrier on a roof of a vehicle, the method comprising:
coupling an elongate base of the carrier to a cross bar with one or more mounting feet, the base having an upper surface configured to receive the watersport equipment;
disposing the watersport equipment on the elongate base in a direction generally perpendicular to a longitudinal axis of the elongate base;
passing a securement strap over a top surface of the watersport equipment, the strap having an anchor end coupled to the base at an anchoring point;
adjusting the strap by sliding the anchoring point along a longitudinal axis of the base while the strap is coupled to the base;
opening a release mechanism comprising a strap door pivotally coupled to a distal end of a locking portion of the elongate base by pivoting the strap door away from the locking portion;
passing a free end of the strap through a locking mechanism in a locking portion of the base disposed at an end of the base to secure the strap within the locking mechanism; and
locking a lock extending through a housing of the locking portion to prevent actuation of a release mechanism configured to release the strap from the locking mechanism.

17. The method of claim 16, further comprising:
adjusting the carrier to accommodate a width of the watersport equipment; and
adjusting a sheath slidably disposed about the strap such that the sheath contacts an edge of the watersport equipment.

18. A watersport equipment carrier configured to be mounted on a vehicle, the watersport equipment carrier comprising:
an elongate base having an upper surface configured to receive watersport equipment and a locking portion;
a securement strap having an anchor end and a free end, wherein the anchor end is coupled to the base at an anchoring point, wherein the anchoring point is configured to slide along a longitudinal axis of the base while coupled to the base; and
a locking mechanism coupled to the locking portion of the base and configured to secure the free end of the strap to the base, wherein the free end of the strap passes through the locking mechanism in a locked configuration,
wherein the locking portion is disposed at an end of the base and the locking mechanism comprises a strap cam configured to frictionally engage the strap against an interior surface of the locking mechanism to secure the strap in the locking mechanism,
wherein the locking mechanism is disposed in a housing and the interior surface is part of the housing, and
wherein the interior surface is part of a strap door of the housing.

* * * * *